United States Patent [19]

Takagi et al.

[11] 4,395,465
[45] Jul. 26, 1983

[54] MAGNETIC RECORDING MEDIUM AND PROCESS FOR PRODUCTION THEREOF

[75] Inventors: Toshinori Takagi, Nagaokakyo; Shinsaku Nakata, Toyoaka; Yoichi Mikami, Kyoto; Masahiro Hotta; Yoshiyuki Fukumoto, both of Osaka, all of Japan

[73] Assignee: Sekisui Kagaku Kogyo Kabushiki Kaisha, Osaka, Japan

[21] Appl. No.: 290,966

[22] Filed: Aug. 7, 1981

[30] Foreign Application Priority Data

Aug. 13, 1980 [JP] Japan ................................ 55/112121

[51] Int. Cl.$^3$ ............................................. C23C 15/00
[52] U.S. Cl. ................................ 428/626; 204/192 N; 428/928; 428/934
[58] Field of Search ................................ 427/127–132, 427/48, 38; 428/900, 694, 928, 934, 626; 204/192 N

[56] References Cited

U.S. PATENT DOCUMENTS 4,152,478 5/1979 Takagi .............................. 427/38 X

FOREIGN PATENT DOCUMENTS

| 197807 | 7/1978 | Fed. Rep. of Germany | 427/128 |
| 54-141111 | 11/1979 | Japan | 427/132 |
| 53-84464 | 1/1980 | Japan | 427/128 |

*Primary Examiner*—Bernard D. Pianalto
*Attorney, Agent, or Firm*—Wenderoth, Lind & Ponack

[57] ABSTRACT

A magnetic recording medium comprising
(a) a flexible substrate of a polymeric material,
(b) a first magnetic layer of a ferromagnetic metal deposited on the substrate by an ionized cluster beam deposition method, and
(c) a second magnetic layer of a ferromagnetic metal deposited on the first magnetic layer by a high-vacuum ion plating deposition method, and a process for producing a magnetic recording medium which comprises
imparting a kinetic energy in the range of 100 eV to 10 KeV to an ionized cluster composed of ferromagnetic metal atoms in a high vacuum corresponding to a pressure of $8 \times 10^{-4}$ to $1 \times 10^{-10}$ torr and impinging the resulting ionized cluster beam against a flexible substrate of a polymeric material to deposit a first magnetic layer of the ferromagnetic metal on the substrate, and
imparting a kinetic energy in the range of 1 eV to 10 KeV to atom ions of a ferromagnetic metal by an ion plating method in a high vacuum corresponding to a pressure of $8 \times 10^{-4}$ to $1 \times 10^{-10}$ torr, and impinging the resulting atom ion beam against the first magnetic layer to deposit a second magnetic layer of the ferromagnetic metal on the first magnetic layer.

4 Claims, 4 Drawing Figures

MAGNETIC RECORDING MEDIUM AND PROCESS FOR PRODUCTION THEREOF

This invention relates to a magnetic recording medium suitable for high-density recording comprising a substrate of a polymeric material and a thin vapor-deposited layer of a ferromagnetic metal formed on the substrate, and to a process for producing said magnetic recording medium.

Recently, magnetic recording media composed of a non-magnetic substrate and a thin ferromagnetic metal film as a magnetic recording layer formed on the substrate without using a resinous binder have been energetically investigated and developed using such film-forming methods as wet plating, vacuum deposition, sputtering and ion plating in an attempt to obtain a striking increase in recording density, and some of them have already gained commercial acceptance. In practice, however, these magnetic recording media have their own defects, and still have problems to be solved when they are intended for use in high-performance and high-density recording.

Specifically, because thin-film type magnetic recording media formed by wet plating or vacuum deposition have a very low adhesion strength between the magnetic layer and the substrate, they have the defect that the magnetic layer tends to be peeled, worn or otherwise damaged by mechanical friction which occurs upon contract with the magnetic head during recording and playback. Thin film-type magnetic recording media formed by sputtering and ion plating have an improved adhesion strength between the magnetic recording layer and the substrate. Since, however, film formation by these methods relies on the utilization of glow discharge or plasma in a low vacuum corresponding to $10^{-3}$ torr or higher, the inclusion of residual gases and impurities adversely affects the crystallinity of the ferromagnetic layer, and the resulting magnetic recording medium has defective magnetic characteristics typified by reduced squareness ratios. Owing to the non-uniformity of a discharging condition, the magnetic recording media obtained by these methods vary in film quantity and magnetic characteristics.

It is an object of this invention therefore to provide a magnetic recording medium which has magnetic characteristics suitable for high-density recording (that is to say, a high coercivity and a high squareness ratio) and can withstand repeated use without the peeling, wearing or damage of the magnetic recording layer by contact with a magnetic head; and a process for producing such an improved magnetic recording medium continuously at high speeds.

According to this invention, there is first provided, as a product meeting this object, a magnetic recording medium comprising a flexible substrate of a polymeric material, a first magnetic layer of a ferromagnetic metal formed on the substrate by an ionized cluster beam deposition method, and a second magnetic layer of a ferromagnetic metal formed on the first magnetic layer by a high-vacuum ion plating deposition method.

According to this invention, there is also provided, as a process meeting the above object, a process for producing a magnetic recording medium, which comprises imparting a kinetic energy in the range of 100 eV to 10 KeV to ionized clusters composed of a ferromagnetic metal atom in a high vacuum corresponding to a pressure of $8 \times 10^{-4}$ to $1 \times 10^{-10}$ torr, impinging the resulting ionized cluster beam against a flexible substrate of a polymeric material to deposit a first magnetic layer composed of the ferromagnetic metal on the substrate, then imparting a kinetic energy in the range of 1 eV to 10 KeV to an atom ion of a ferromagnetic metal by an ion plating method in a high vacuum corresponding to a pressure of $8 \times 10^{-4}$ to $1 \times 10^{-10}$ torr, and impinging the resulting atom ion beams against the aforesaid magnetic layer to form a second magnetic layer of the ferromagnetic metal on the first magnetic layer.

The flexible substrate of a polymeric material used in this invention means a sheet, film, tape, etc. molded from polymeric materials such as polyvinyl chloride, polyvinyl fluoride, cellulose acetate, polyethylene terephthalate, polybutylene terephthalate, polyethylene, polypropylene, polycarbonate, polyamides, polyimide, polyether sulfone, and polyparabanic acid. The substrate has a thickness of preferably 4 microns to 100 microns, especially preferably 4 microns to 30 microns.

The ferromagnetic metal in this invention may be a metallic element such as iron, nickel and cobalt, and an alloy or mixture containing at least one metal selected from the group consisting of iron, nickel and cobalt. Examples of the iron alloys are alloys of iron with cobalt, nickel, manganese, chromium, copper, gold, titanium, etc.; examples of the cobalt alloys are alloys of cobalt with phosphorus, chromium, copper, nickel, manganese, gold, titanium, yttrium, samarium, bismuth, etc.; and examples of the nickel alloys are alloys of nickel with copper, zinc, manganese, etc. Examples of the aforesaid mixture are mixtures of iron, cobalt and/or nickel with phosphorus, chromium, copper, zinc, gold, titanium, yttrium, samarium and/or bismuth.

The ionized cluster beam deposition method used in this invention comprises heating a closed type crucible having a jet nozzle containing a ferromagnetic metal charged thereinto in a vacuum chamber evacuated to a high vacuum corresponding to a pressure of $8 \times 10^{-4}$ torr to $1 \times 10^{-10}$ torr to raise the vapor pressure within the crucible to $10^{-2}$ torr or more, thus jetting out the vapor from the nozzle of the crucible thereby to form a cluster of 500 to 2,000 atoms of said material, further ionizing the cluster by electron impingement to form an ionized cluster, concentrating the ionized cluster by a field effect, accelerating it to provide an ionized cluster beam having imparted thereto a kinetic energy of 100 eV to 10 KeV, and impinging the ionized cluster beam against the surface of the substrate to form a thin film of the ferromagnetic metal. According to the ionized cluster beam deposition method, a thin magnetic film having good crystallinity can be obtained because of the following effects.

(1) A so-called migration effect shown by the fact that the ionized cluster consisting mainly of the ferromagnetic metal atoms impinged against the surface of the substrate is decomposed into the individual atoms by the energy generated upon impingement.

(2) A self-heating effect shown by the fact that when the ionized cluster bombards the surface of the substrate, a part of the energy is converted to a thermal energy to raise the temperature locally and thus heat the surface of the deposited film.

(3) A chemically activating effect by the presence of an ion.

Since the aforesaid self-heating effect makes it unnecessary in particular to heat the substrate, this vapor deposition method can be applied conveniently to the production of magnetic recording media having a polymeric material with a low softening point such as polyethylene terephthalate as a substrate.

The high-vacuum ion plating method used in this invention comprises feeding a ferromagnetic metal material into an open type crucible in a vacuum chamber evacuated to a high vacuum corresponding to a pressure of $8 \times 10^{-4}$ torr to $1 \times 10^{-10}$ torr, heating the ferromagnetic metal material by such means as resistance heating, electron beam heating, electron bombardment heating and induction heating to vaporize it, accelerating electrons coming from an electron emission source in an electric field, impinging the accelerated electrons against the vapor particles to ionize the particles, accelerating the ionized vapor particles by a field effect to impart a high kinetic energy of 1 eV to 10 KeV, and impinging the resulting atom ion beam against the surface of the substrate to form a thin film of the ferromagnetic metal.

One preferred embodiment of the invention is described in detail below with reference to the accompanying drawings in which:

BRIEF DESCRIPTION OF THE DRAWING

As shown in FIG. 1, the magnetic recording medium of the invention consists of a flexible substrate 1 of a polymeric material, a first magnetic layer 2 of a ferromagnetic metal formed on the substrate 1 by the ionized cluster beam deposition method, and a second magnetic layer 3 of a ferromagnetic metal formed on the first magnetic layer 2 by the high-vacuum ion plating method. The magnetic layer 2 has a thickness of 10 to 3,000 Å, preferably 100 to 1,000 Å, and the magnetic layer 3 has a thickness of 100 Å to 1 micron, preferably 200 to 5,000 Å.

Referring to FIG. 2, a vacuum chamber 4 is adapted to be evacuated to a high vacuum corresponding to a low pressure of $8 \times 10^{-4}$ torr or below by means of an evacuation system (comprised of an oil rotary pump, an oil diffusion pump, etc. but not shown) connected to an exhausted pipe 42.

Figure 1:
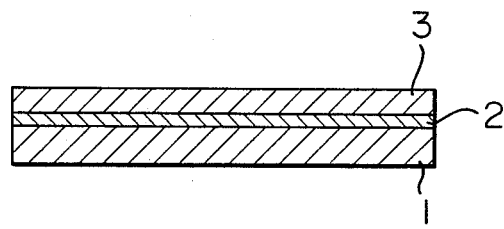
FIG. 1 is a cross-sectional view of one embodiment of the magnetic recording medium of this invention.

A film-like polymeric substrate 5 is continuously conveyed by a feed mechanical comprised of a feed roll 51, guide rolls 6, 6'' and 6''' and a wind-up roll 52 (a roll driving device composed of a motor, a gear, etc. is not shown). The travelling path of the substrate 5 can be adjusted by the guide rolls 6, 6' and 6'' so that the magnetic layers can be successively formed by an ionized cluster source 7 for deposition and an ion source 8 for ion plating, and that ionized cluster beams 9 and atom ion beams 10 fall upon the substrate 5 in specified directions.

At the back of the substrate 5 are disposed accelerating electrodes 11 and 12 opposite to the ionized cluster source 7 and the ion source 8 respectively so as to accelerate the ionized clusters and the atom ion in an electric field. A negative direct-current voltage is applied to these electrodes from a power supply 13.

Figure 3:
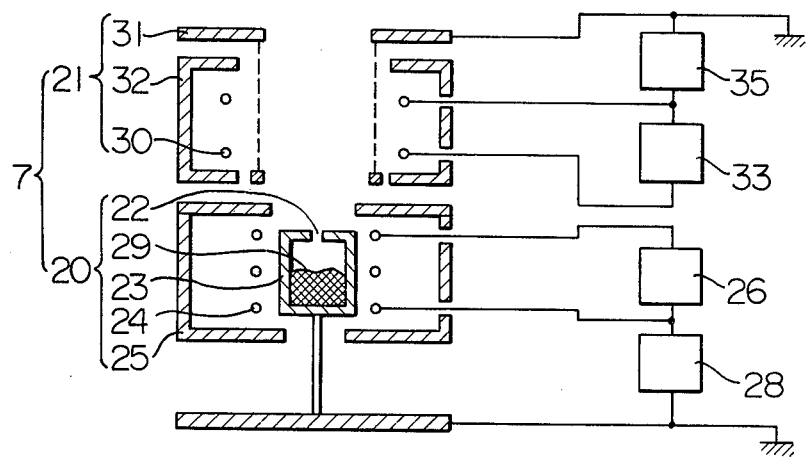
FIG. 3 is a diagram showing the structure of an ionized cluster source 7 shown in FIG. 2.

In FIG. 3, the ionized cluster source 7 for deposition is made up of a cluster-generating section 20 and an ionizing section 21.

The cluster-generating section 20 is comprised of a closed type crucible 23 having a vapor jetting nozzle 22, a filament 24 for emitting thermoelectrons and a guard 25 for field control. The cluster is generated by electrically heating the filament 24 by a power supply 26 disposed outside the vacuum chamber 4 to allow the filament to emit thermoelectrons, applying a negative dc-voltage to the filament by means of a power supply 28, thus bombarding the accelerated electrons against the outside wall of the crucible 23 to heat the crucible 23 and thus to vaporize a ferromagnetic metal 29 fed into the crucible 23, and jetting out the vapor of the ferromagnetic metal from the jet nozzle 22.

The ionizing section 21 is comprised of a filament 30 for emitting thermoelectrons, a mesh electrode 31 for accelerating the electrons in an electric field, and a guard 32 for field control. In the ionizing section 21, the cluster is ionized by electrically heating the filament 30 by a power supply 33 to emit thermoelectrons, applying a negative dc voltage to the filament 30 by a power supply 35 and grounding the mesh electrode 31 to accelerate the electrons in an electric field, and impinging the accelerated electrons against the cluster generated in the cluster-generating section 20.

Figure 2:
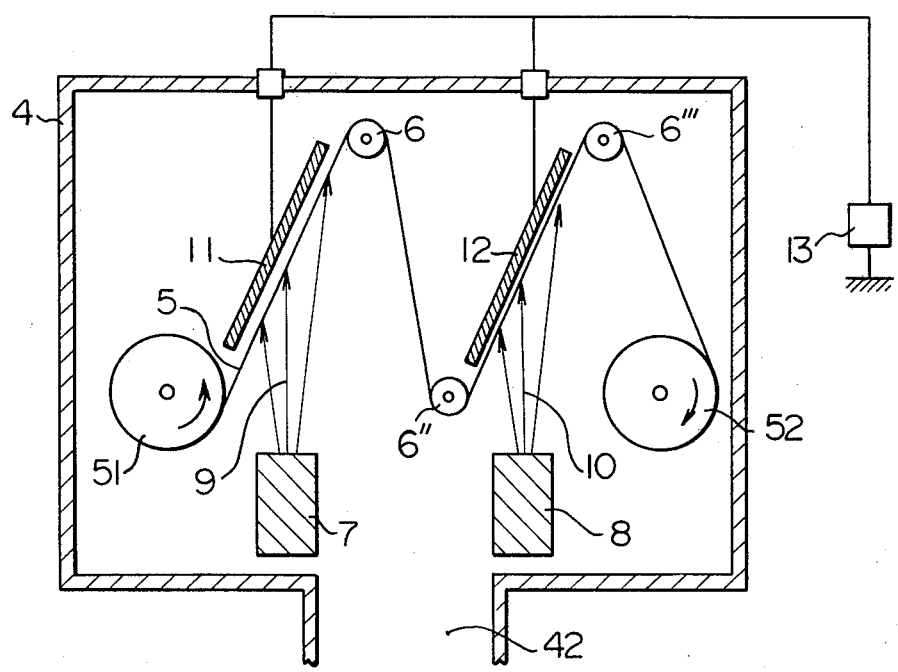
FIG. 2 is a diagram showing one example of an apparatus for practicing the process of the invention.

The ionized cluster is given a kinetic energy by the accelerating electrode 11 shown in FIG. 2, and comes into collision with the surface of the substrate 5 whereby a magnetic layer is formed.

Figure 4:
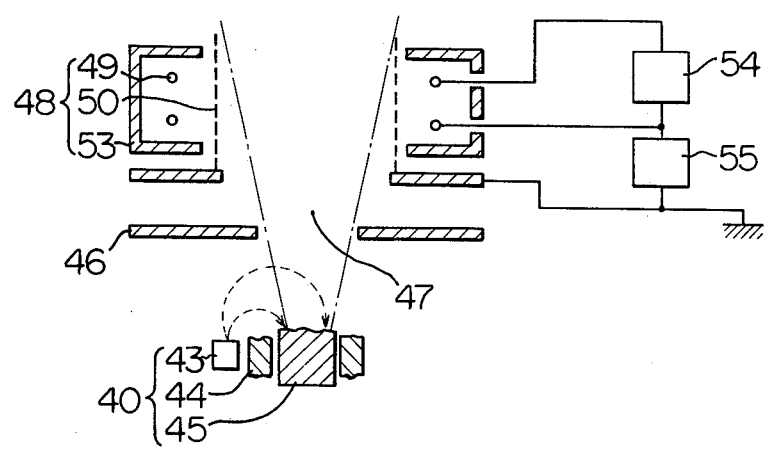
FIG. 4 is a diagram showing an ion plating source 8 shown in FIG. 2.

Referring to FIG. 4, there is shown an electron beam evaporation source 40 consisting of an E gun 43, a water-cooled copper hearth and a vapor source material (a power supply is not shown). Shown at 46 is a baffle plate for hampering passage of a vapor. A vapor flow 47 which advances as shown is ionized in an ionizing section 48. The ionizing section 48 is comprised of a filament 49 for emitting thermoelectrons, a mesh electrode 50 for accelerating electrons in an electric field and a guard 53 for field control.

Vapor particles are generated by heating the vapor source material 45 with the E gun 43. The vapor particles are ionized by electrically heating the filament 49 by power supplies 54 and 55 located outside the vacuum chamber 4 to emit thermoelectrons, and simultaneously applying a negative dc voltage to the filament 49 to accelerate the electrons in an electric field. The vapor particle ion is then accelerated by the accelerating electrode 12 shown in FIG. 2 to impart a kinetic energy thereto, whereupon it becomes vapor particle beams. The accelerated atom ion beam, as shown in FIG. 2, are impinged against the first magnetic layer formed on the substrate 5 by the ionized cluster beam impingement in the previous step. Thus, the second magnetic layer is formed on the first magnetic layer by high-vacuum ion plating.

The magnetic recording medium of the invention is produced by first depositing a magnetic layer of a ferromagnetic metal on the substrate by the ionized cluster beam deposition method, and then depositing another ferromagnetic layer on the above magnetic layer by the high-vacuum ion plating method. In the ionized cluster beam deposition, oblique impingement of the ionized cluster beams to the substrate surface is preferred for the improvement of the magnetic properties of the resulting recording medium, particularly for the increasing of its coercivity. Furthermore, in performing the high-vacuum ion plating method, the incidence direction of the atom ion beam should preferably be made the same as that of the ionized cluster beam.

Since in the process of this invention, the magnetic layers are formed under high vacuum, inclusion of impurities and gases into the magnetic layers can be avoided, and the resulting magnetic layers have excellent crystallinity and magnetic characteristics, particularly a high squareness ratio. Furthermore, because the first magnetic layer in contact with the substrate is formed by the ionized cluster beam deposition method, the adhesion strength between the substrate and the magnetic layer is high, and the packing density (usually 0.75 or more) of the magnetic layer is higher than magnetic layers formed by other thin-film forming methods. As a result, the magnetic layer does not undergo peeling, dropping and damage during use.

In addition, since the process of the invention includes as one step the high-vacuum ion plating method which is in itself of high efficiency, magnetic layers can be deposited continuously at high speeds according to the process of this invention. Accordingly, a magnetic recording medium having the aforesaid high performance can be produced at high speeds. Moreover, according to the process of this invention, the direction of growth of crystal grains can be controlled by adjusting the incidence directions of the ionized cluster beams and the atom ion beams. Thus, it is possible to orient the axis of easy magnetization in a specified controlled direction and thus to control the magnetic properties, especially coercivity, of the resulting magnetic recording medium.

The following Examples illustrate the present invention more specifically.

EXAMPLE 1

A magnetic recording medium was produced under the conditions shown below by using a continuous manufacturing apparatus of the type shown in FIG. 2.

Substrate: polyethylene terephthalate film (9 microns thick)
Material for the magnetic layers: cobalt (purity 99.9%)
Film feeding speed: 10 mm/min.
Operating conditions: as shown in Table 1.

TABLE 1

| | Ionized cluster beam deposition process | High-vacuum ion plating deposition process |
|---|---|---|
| Beam incidence angle (°) | 70 | 70 |
| Ionizing voltage (V) | −500 | −500 |
| Ionizing current (mA) | 100 | 150 |
| Ion accelerating voltage (KV) | −2.0 | −1.2 |
| Thickness of the resulting film (Å) | about 700 | about 1,000 |

In the resulting magnetic recording medium, the adhesion strength between the substrate and the ferromagnetic layer was examined by a peel test using a cellophane tape. No peeling occurred.

The resulting magnetic recording medium in the form of an endless tape was tested for wear of its ferromagnetic thin layer in a commercial open reel-type recorder at a tape speed of 9.5 cm/sec in a playback mode. After 100 repeated playback cycles, no clear trace of wear could be detected with the naked eye.

The magnetic characteristics of the resulting magnetic recording medium were measured by a DC magnetization measuring instrument. It was found to have a coercivity of 690 oersteds, a residual flux density of 9100 gauss, and a squareness ratio of 0.95. This shows that the resulting magnetic recording medium has a high coercivity and a high squareness ratio required for high-density recording.

What we claim is:

1. A process for producing a magnetic recording medium, which comprises imparting a kinetic energy in a range of 100 eV to 10 KeV to an ionized cluster composed of ferromagnetic metal atoms in a high vacuum corresponding to a pressure of $8 \times 10^{-4}$ to $1 \times 10^{-10}$ torr and impinging the resulting ionized cluster beam against a flexible substrate of polymeric material to deposit a first magnetic layer of the ferromagnetic metal on said substrate, and then, imparting a kinetic energy in a range of 1 eV to 10 KeV to atom ions of a ferromagnetic metal by an ion plating method in a high vacuum corresponding to a pressure of $8 \times 10^{-4}$ to $1 \times 10^{-10}$ torr and impinging the resulting atom ion beam against said first magnetic layer to deposit a second magnetic layer of the ferromagnetic metal on said first magnetic layer, wherein in forming the above first magnetic layer, a plate-like accelerating electrode is disposed on the side of the flexible substrate opposite its surface facing the ionized cluster source to field-accelerate the ionized cluster, and, in forming the said second magnetic layer, a plate-like accelerating electrode is disposed on the side of the substrate opposite its surface facing the atom ion source to field-accelerate the atom ions.

2. The process of claim 1 wherein the ionized cluster beam is impinged obliquely to the surface of the flexible substrate.

3. The process of claim 2 wherein the incidence direction of the atom ion beam of the ferromagnetic metal upon the surface of the substrate is the same as that of the ionized cluster beam.

4. A magnetic recording medium produced according to the process of claim 1.

* * * * *